Patented Oct. 18, 1938

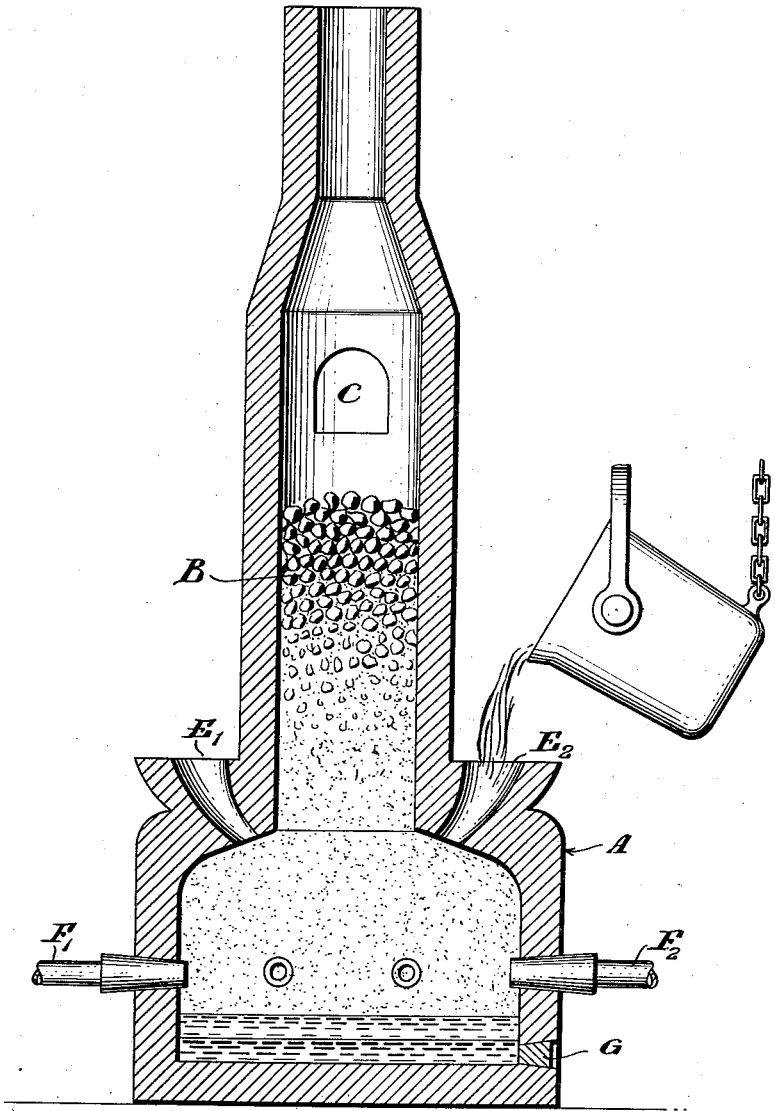

2,133,571

UNITED STATES PATENT OFFICE 2,133,571

PROCESS FOR THE MANUFACTURE OF STEEL FROM LOW-GRADE PHOSPHORUS-CONTAINING ACID IRON ORES

Hermann Röchling and Otto Johannsen, Volklingen-Saar, Germany, assignors to H. A. Brassert & Co. Limited, London, England, a corporation Application July 16, 1936, Serial No. 91,008
In Germany July 24, 1935

2 Claims. (Cl. 75—29)

This invention relates to a process for the manufacture of steel from low-grade phosphorus-containing acid iron ores.

Large seams of low-grade iron ores containing phosphorus and large quantities of silica exist, in which it is impossible to increase the concentration of the iron by washing, magnet-separation and the like procedures, or the losses in iron or costs of working up become too high. A method is described below, which enables steel, particularly Thomas steel, to be produced from such ores.

According to the process of this invention the ores are first smelted in a blast furnace. If the existing process with basic slags were to be employed the high silica content of the ores would require so much addition of lime that the consumption of limestone and coke would render the smelting operation uneconomical. In addition the furnace output would be too much reduced. Furthermore the large quantities of slag would give rise to considerable losses of manganese and accordingly to very poor yields of manganese.

Accordingly in the process of this invention as applied to the treatment of low-grade iron ores having high silica contents, the addition of manganese ores and other substances rich in manganese is dispensed with and the ores are smelted in a blast furnace as far as possible without the addition of lime.

At the time when small wood charcoal blast furnaces were used and in the puddled iron period the blast furnaces were also operated with slags poor in lime, but a large amount of iron was lost thereby in the slag. Attempts in a recent large blast furnace employing a blast heated to 750 to 850° C. have shown that the acid slag process may also be used in modern coke blast furnaces. Oolitic ores having an iron content of 23% of Fe were smelted in the dry state in a blast furnace having an effective capacity of about 500 cubic metres and a hearth diameter of 4.7 metres without any addition of lime and manganese ores and without admixing any other ores. The resulting slag contained:

|  | Per cent |
|---|---|
| $SiO_2$ | 45 |
| $CaO$ | 25 |
| $Al_2O_3$ | 18 |
| $MgO$ | 2 |
| $Fe$ | 2–3 |
| $S$ | 1 |

The charge subsided without any disturbance in the furnace, although there was a risk that the readily fusing ore mass, owing to its uniform composition, would soften at a certain point in the blast furnace and sinter together into a lump obstructing the passage of the gas. In actual fact the only irregular working proved to be that the temperature of the tappings was reduced and the iron content of the slag was increased. Operating the furnace with a blast heated to a very high temperature (up to 850° C.) offered no difficulties and no bridge or suspension phenomena occurred in this method of working.

The acid slag was viscous, but flowed satisfactorily out of the furnace; it entrained only small quantities of iron granules, but contained 2 to 3% of iron, mostly in a condition of microscopically fine distribution, so that it could deposit only slowly. The outflowing slag accordingly regularly contained more iron than the so-called tapped slag flowing out of the crude iron tappings.

It appears that when the slag contains about 20% of lime the limit is reached below which the blast furnace cannot be operated even with charges rich in alumina. In the case of slags poor in alumina the limit might possibly be somewhat higher. In the case of ores very poor in lime therefore as much lime or lime-containing material must be added, as is necessary to produce a sufficiently easily smelting slag.

The throughput of blast furnaces in the acid slag process is high, so that in this manner a large quantity of crude iron may be produced, notwithstanding the low iron content of the charge. A necessary condition in this case is that the ores must be prepared by crushing and briquetting the fine ore. Argillaceous fine ores can be cheaply briquetted and compressed in roller presses and rod presses. The coke consumption at the low melting temperature of the slag is relatively low, but is in itself higher than when smelting rich ores in the usual manner. Consequently before commencing the smelting of low-grade ores, it is necessary to ascertain by means of technical heat calculations at what points in the blast furnace a deficiency of heat may occur. If this should be the case in the shaft zone, it is advisable first to roast or sinter the ores, in order to reduce the heat consumption in the calcining zone.

The smelted crude iron differs substantially from the usual steel making crude iron produced in a blast furnace operating with usual basic slags.

In the case of ores rich in manganese also the manganese content of the crude iron blasted with acid slag is low. This however is no detriment when blasting in the Thomas converter, since the development of heat owing to the combustion of the manganese does not play an important part in the Thomas process. Since in the Thomas slag an equilibrium sets in between ferrous oxide and manganous oxide, the loss of iron in the Thomas crude iron poor in manganese is lower than in the normal Thomas crude iron.

The carbon content of the acid smelted crude iron is relatively low, this is however of no account in the further working up.

As is known, the reduction of silicon is promoted by an acid slag process. Since a relatively high silicon content hinders the process of blasting in the Thomas converter the reduction of silicon in the blast furnace must be limited as far as possible. For this purpose, if one does not wish to lower the temperature of the blast, which would increase the coke consumption to an undesirable extent, the following procedures are employed:

A low ash-yielding coke is employed, the hearth of the blast furnace is widened and the distance between the tuyères is increased. A strong blast is employed and the furnace operation is so regulated that neither the loss of iron in the slag nor the reduction of the silicon become too high. It has in this case proved to be possible with a slag containing 25 to 30% of CaO and a blast temperature of more than 750° C. to maintain the iron content of the tapped slag below 2½% and the silicon content of the iron below 0.8%.

The most important difference as compared with the normal Thomas crude iron is to be found in the high sulphur content of the acid smelted crude iron. The desulphurizing action of the acid slags is substantially less than that of the basic slags. Nevertheless the capacity of the acid slags for absorbing sulphur is considerable, so that in the smelting of low-grade ores a desulphurization by the slags of at least 50% can be counted on. Nevertheless the crude iron contains much more sulphur than is usually the case in the basic process, so that the resulting crude iron cannot be directly worked up by the Thomas process into steel. In the case of sulphur-containing ores, for example South Baden Dogger ore, the sulphur content may even rise to more than 1%.

Various methods exist for working up this iron produced by an acid smelting process which will hereinafter be referred to as acid smelt iron. The product may be re-smelted with calcareous slags in a hearth furnace or a cupola furnace with or without the addition of manganese and be desulphurized in this manner. In order to avoid the troublesome operation of pig-iron casting and to save the heat required for re-smelting, the acid-smelt iron may be poured in a liquid condition into a shaft furnace filled with coke and lime, at the bottom of which there is disposed a bath of highly basic slag. A shaft furnace provided with an intermediate opening for charging liquid material may also be employed for desulphurizing. The shaft serves for pre-heating coke and lime, whilst the liquid crude iron is poured in at a lower position in the shaft furnace.

A furnace as aforesaid is illustrated in the accompanying drawing.

The smelting furnace A is provided with a shaft-like neck B. Coke and limestone are introduced at C, whilst the liquid acid smelt iron disposed in the pot D is poured in through the hoppers $E_1$ and $E_2$. $F_1$ and $F_2$ are the blast tuyères. The slag and iron collect in the hearth of the furnace and are removed from time to time through the tapping opening G.

The arrangement shown, in addition to economy in coke, has the advantage that, owing to the low coke consumption, less sulphur is introduced into the furnace, whereby the desulphurization of the acid smelt iron is facilitated. Fuel poor in sulphur is also with advantage employed. Specular iron, ferro-manganese, manganese ore and other substances promoting desulphurization may be added as fluxes. In order to render the highly basic slags more reactive, liquefying agents may be added, for example alkalies and fluorspar.

Sodium carbonate (hereinafter referred to as "soda"), if desired containing additions such as alkaline earths which promote the desulphurizing action of the soda, have also proved to be very suitable desulphurizing agents. The use of soda for the subsequent desulphurization of crude cast iron is known per se. Such known use of soda is however as a rule restricted to the removal of the last traces of sulphur from relatively small quantities of iron. In such cases the soda is usually introduced in a loose or compressed form into the ladle.

According to an embodiment of the process of this invention it has been found that satisfactory and uniform results are obtained if the sodium carbonate is first melted down in a crucible of suitable metal or in a reverberatory furnace and the liquid soda is then allowed to run out into the ladle together with the crude iron. A vigorous reaction immediately sets in which may be promoted by pouring the melt into another ladle or by stirring.

Numerous experiments have shown that more than 80% of the sulphur present may be removed by one single treatment with liquid soda, the soda slag removing up to 15% of sulphur. For example, to 20 tons of liquid crude iron containing 0.30% of sulphur there were added 400 kgms. of previously molten soda, corresponding to 2% of the weight of crude iron. After the treatment the crude iron contained only 0.05% of S. Accordingly 40 kgms. of sulphur were transferred to the soda slag. In the case of crude iron poorer in sulphur, ½ to 1% of soda is sufficient. With high contents of sulphur the soda slag must be removed after the reaction is finished and the iron melt must be again treated with soda. When using liquid soda, the iron melt remains satisfactorily liquid and in this way even crude iron containing 1% of sulphur can be satisfactorily desulphurized.

If acid smelt iron containing a very high percentage of sulphur is to be desulphurized, the acid smelt iron may also be first pre-desulphurized as above with basic slag in a shaft furnace, a hot blast being with advantage used in the re-smelting furnace to increase the reaction temperature and the acid smelt iron so pre-treated may be afterwards desulphurized with soda.

A great advantage of the treatment with soda is the strong action of the soda on the silicon contained in the crude iron. A high silicon content in the Thomas steel is known to hinder the process of blasting in the Thomas converter, since such an iron on blasting becomes very disturbed and throws off considerable quantities of iron so that production and yield are low. By means of the soda treatment however the silicon content can be very considerably reduced. For example the silicon content of a crude iron containing 0.70% of silicon was reduced by treatment with 2% of soda to 0.4%. The de-silicifying action of the soda is consequently of great importance.

The desulphurized acid smelt iron is then blasted in the Thomas converter into steel. The soda slag employed may be again worked up to soda by treating the slag with water, decomposing the sodium silicate formed by passing carbon dioxide thereinto, filtering off the precipitated silica and finally converting the soda with an excess of carbon dioxide into sodium bicarbonate. Owing to its slight solubility the latter separates out and can be filtered off. The pure waste gases from blast furnace gas heaters or machines, containing up to 25% of $CO_2$, may with advantage be employed for precipitation.

The soda slag may however also be directly employed for the manufacture of glass and the like and in this event the sulphur contained therein may be recovered.

Instead of being effected with soda, the desulphurization of the acid smelt iron may also be effected in an electric furnace. The procedure may be followed of bringing the acid smelt iron in a liquid form into a suitable electric furnace, for example an induction furnace provided with strong stirring apparatus, desulphurizing the acid smelt iron therein with slag rich in lime and subsequently refining the desulphurized crude iron in the Thomas converter.

An alternative procedure is to blast the crude iron rich in sulphur in a Thomas converter whereby a large portion of the sulphur contained therein is removed. For example acid smelt iron obtained by working up South Baden dogger ore in a blast furnace and containing 1.20% of sulphur, after blasting in a basic converter, yielded a crude steel containing 0.4% of sulphur. If the latter is thereafter introduced in a liquid condition into an electric furnace and further treated therein, a high-grade steel containing less than 0.01% of sulphur is obtained at relatively low costs of conversion.

In many cases it is advisable first to concentrate the ores and then to work up the residues without the addition of lime in a blast furnace to acid smelt iron. This method is to be preferred if it is possible to produce a concentrate from the ores and the residues from the dressing operation contain sufficient iron to make the recovery thereof pay. In this case the concentrate may be worked up by the usual process with basic slags in a blast furnace, for example to foundry pig-iron and the residues may be smelted with acid slags to acid smelt iron. If the concentrate contains only small amounts of impurities as compared with the crude ore, high-grade crude or pig iron on the one hand and phosphorus-containing acid smelt iron on the other hand may in this way be simultaneously produced. The process may for example be employed in the working up of the low-grade South Baden dogger ores. These consist of oolites containing about 50% of iron, 10% of silica, 0.3% of phosphorus and 0.1% of sulphur embedded in an argillaceous mass containing about 20% of iron, 24% of silica, 0.4% of phosphorus and 0.5% of sulphur. The concentrate accordingly yields a satisfactory foundry pig-iron containing 0.6% of phosphorus, whilst the residues may be used for the production of Thomas steel according to the above described process.

In the smelting of low-grade ores the preparation thereof plays an important part, particularly if the ores contain a large amount of sulphur, as for example the South Baden dogger ores. In the case of easily fusible argillaceous ores, such as South Baden dogger ores, it is difficult to desulphurize these by sintering, since the melting point is too near the sintering point. It has therefore proved to be advisable to heat these ores so strongly that they become liquid and can be withdrawn from the furnace in liquid form. Experiments have shown that easily fusible argillaceous ores may be smelted, without any addition of solid fuel to the charge in the shaft furnace, with gas, oil or coal dust firing and be tapped from the furnace in liquid form. This result is surprising, since it has hitherto been assumed that the substances to be smelted in the shaft furnace require an infusible carrier, such as wood charcoal, coke or anthracite, in order that the charge may remain permeable to gas. Particularly in the case of easily softening argillaceous ores one would necessarily assume that the charge would agglomerate into a lump impermeable to gas in one of the furnace zones. Experiments have shown however that this view is wrong. The charge is just as permeable to gas as when adding coke and easily subsides in the furnace shaft, without deposits and suspended arches forming when operating in a suitable manner. Experiments have further shown that tapping of the molten ore from the furnace offers no difficulties. For example, when smelting South Baden dogger ore the smelt was already thinly liquid at 1270° C.

The output of such an ore-smelting furnace is very large. In the case of a South Baden dogger ore more than one ton of crude ore per hour could be treated per cubic metre of effective furnace capacity. In a shaft furnace of 500 cubic metres effective capacity accordingly more than 12000 tons of crude ore per day can be treated. Furnaces having a very high output are preferably constructed oblong in cross-section, since otherwise the heating effect on the charge is not sufficiently uniform. Internal tuyères may however also be used.

According to this invention it has been further found that the combustion can easily be so adjusted that the waste gases of the furnace are completely burnt. It follows therefrom and also from the high throughput that the heat consumption of the furnace is relatively low. In the case of dogger ore coal consumption of from 4 to 5%, calculated on the crude ore, is sufficient. It is possible further to reduce the heat consumption by utilizing the waste heat and the heat contained in the smelted ore. A further advantage is the extensive desulphurization of the ore; the sulphur content of the smelted dogger ore in this case amounts only to 0.1% of S as compared with 0.4 to 0.5% of S in the crude product.

Notwithstanding the absence of a reducing atmosphere, the iron is contained in the smelted ore in the form of ferrous oxide. The furnace accordingly performs a part of the reducing action. When heating with coal dust a part of the iron is further reduced to metallic iron, which is distributed in the melt in the form of fine grains. When operating the furnace at very high temperatures a part of the iron may also be withdrawn in the form of liquid, especially if a part of the combustion air is introduced at a higher position of the furnace as secondary air.

Very efficient utilization of heat is obtained if the heat contained in the melt is used for subsequent reduction with gaseous, liquid or solid fuels. Carbon monoxide is formed thereby and may be used for preheating the blast or for smelting the ore.

The process admits of various embodiments. The crude ore may be smelted at a suitable place, for example at the mine, in a crude or pre-broken condition with any desired fuel, for example with gas transmitted from a distance, cold or hot producer gas, hot oil, brown coal dust, coal waste and the like, with the employment of a cold, hot or concentrated blast and the melt be then allowed to set in moulds, or be granulated with water, or steam. The cold material can then be worked up in another place to acid smelt iron as hereinbefore described. Alternatively the heat contained in the melt may be used in the smelting process, by introducing the melt in a liquid condition into the reducing furnace. For this purpose the melt may be collected in pots and poured through suitably disposed openings into the reducing furnace charged with solid fuel. In this combination the hot carbon monoxide-containing waste gases of the reducing furnace are with advantage used for fusing the ore. Alternatively the smelting furnace or smelting shaft may be so arranged, that the liquid iron melt flows under the action of gravity into the reducing furnace.

If it is desired only to roast the ores, special procedures are necessary in the case of easily fusing ores, since otherwise the charge agglomerates in the furnace. Such ores may be roasted in rotary furnaces with coal dust or gas, provided the heat is so regulated that no slag formation takes place. Rotary furnaces however require a large amount of fuel and are expensive to construct and maintain, a fact which must be taken into consideration when treating ores which are below standard and consequently of inferior quality.

According to this invention it has been further found that easily fusing ores may be roasted in shaft furnaces, even when the temperature of sintering is only slightly above the calcining temperature. According to the present invention the easily fusing ores are introduced in a condition of such uniform granulation that all the grains are roasted through at practically the same time. The material must be so fine in grain that the outer parts of the grains of ore do not soften before the core is roasted. Experiments have shown that it is sufficient to sieve the ore between 60 and 15 mms. width of mesh, in order, with a poor clay ironstone, to obtain a roast product containing less than 1% of $CO_2$. The fine ore is preferably briquetted and introduced in the form of briquettes of the same size as the pieces or grains of ore. The relatively fine-grained material at the same time ensures a high throughput of the roasting furnace and dispenses with the necessity of crushing the ore before smelting in the blast furnace. The consumption of coke in the blast furnace is low and a very high throughput is obtained.

It has however been found that fusion in the roasting furnace cannot be with certainty avoided, even with uniform granulation, if fine coke or anthracite coal is employed in the usual manner as fuel. Gas-shaft furnaces may be used, but the gas consumption is too high. It has however been found that fresh coal rich in gas is very suitable for this purpose. Such coal yields a uniform flame which does not give rise to smelting and, notwithstanding the relatively low working temperature, is not extinguished in the calcining furnace. It is advisable to promote spreading of the flame by adding easily combustible substances, such as brown coal, lignite, briquette dust, oil waste and sawdust.

It could not have been foreseen that fresh coal rich in gas, which has a strong tendency to form soot, can be used with efficient utilization of heat in shaft roasting furnaces. A high consumption of heat and considerable formation of smoke in the throat would have been expected. Experiments have shown however that the steam escaping from the furnace is only coloured very light yellow. Tar and soot are retained by the fragments of ore, as soon as the latter have become porous owing to the drying and roasting operations.

It is known that the formation of large smelted lumps in roasting furnaces is prevented by continuously removing the roasted material, because the charge is thereby maintained in movement. It is advisable therefore with easily fusing ores to employ shaft furnaces provided with mechanical removing means, suitably of such a kind that large fused fragments can also be removed thereby from the furnace without the charge subsiding in a non-uniform manner. For this purpose use is made of a drop bottom or grates disposed below the furnaces in known manner. Widely spaced pairs of crushing rollers have proved to be suitable. The spurs or ribs of the rollers break down the large fused pieces and sintered lumps and convey the roast material uniformly out of the furnace.

What we claim is:

1. A process for the manufacture of steel from low grade phosphorus-containing acid iron ores which comprises subjecting the ores to a concentrating treatment, working the concentrate up in a blast furnace to form pig iron, working up the residue in a shaft furnace without the addition of lime or manganese to form an acid smelt iron high in sulphur and low in carbon and silicon, desulphurizing the acid smelt iron and making steel therefrom by the basic process.

2. A process for the manufacture of steel from low grade phosphorus-containing acid iron ores which comprises subjecting the ores to a concentrating treatment, working the concentrate up in a blast furnace to form pig iron, working up the residue in a shaft furnace without the addition of lime or manganese to form an acid smelt iron high in sulphur and low in carbon and silicon, bringing the liquid acid smelt iron into contact in a shaft furnace with basic materials for desulphurization and thereafter converting the iron into steel by the basic process.

HERMANN RÖCHLING.
OTTO JOHANNSEN.